United States Patent
Lerner et al.

(10) Patent No.: US 7,167,314 B2
(45) Date of Patent: Jan. 23, 2007

(54) PROJECTOR WITH TOTAL CROSS TOTAL INTERNAL REFLECTION (TIR) PRISMS

(75) Inventors: Scott Lerner, Corvallis, OR (US); Anurag Gupta, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 37 days.

(21) Appl. No.: 11/082,637

(22) Filed: Mar. 17, 2005

(65) Prior Publication Data
US 2006/0209420 A1   Sep. 21, 2006

(51) Int. Cl.
*G02B 27/14* (2006.01)
*G03B 21/00* (2006.01)

(52) U.S. Cl. .................. 359/629; 359/634; 353/33
(58) Field of Classification Search ................ 359/629, 359/634, 636, 834, 638–640; 353/31, 33, 353/81, 94; 348/750, 771
See application file for complete search history.

(56) References Cited

U.S. PATENT DOCUMENTS

| | | | |
|---|---|---|---|
| 4,983,032 A * | 1/1991 | Van Den Brandt | ........... 353/31 |
| 6,560,048 B1 * | 5/2003 | Okamori et al. | ............ 359/833 |
| 6,594,090 B1 | 7/2003 | Kruschwitz et al. | |
| 6,624,949 B1 | 9/2003 | Roddy et al. | |
| 6,644,813 B1 | 11/2003 | Bowron | |
| 6,676,260 B1 | 1/2004 | Cobb et al. | |
| 6,704,144 B1 * | 3/2004 | Huang | ........................ 359/634 |
| 6,758,565 B1 | 7/2004 | Cobb et al. | |
| 6,807,010 B1 | 10/2004 | Kowarz | |
| 6,808,269 B1 | 10/2004 | Cobb | |
| 6,813,087 B1 | 11/2004 | Davis | |
| 6,959,990 B1 * | 11/2005 | Penn | ........................... 353/81 |
| 2003/0025842 A1 | 2/2003 | Saccomanno | |
| 2004/0119950 A1 | 6/2004 | Penn et al. | |
| 2004/0184007 A1 * | 9/2004 | Silverstein et al. | ........... 353/20 |

* cited by examiner

*Primary Examiner*—Alicia M Harrington

(57) ABSTRACT

A projector has at least first and second micro-displays and at least first and second cross total internal reflection prisms respectively optically coupled to the at least first and second micro-displays. Each of the at least first and second cross total internal reflection prisms has first and second total internal reflection interfaces. A combiner is optically coupled to the at least first and second cross total internal reflection prisms.

27 Claims, 4 Drawing Sheets

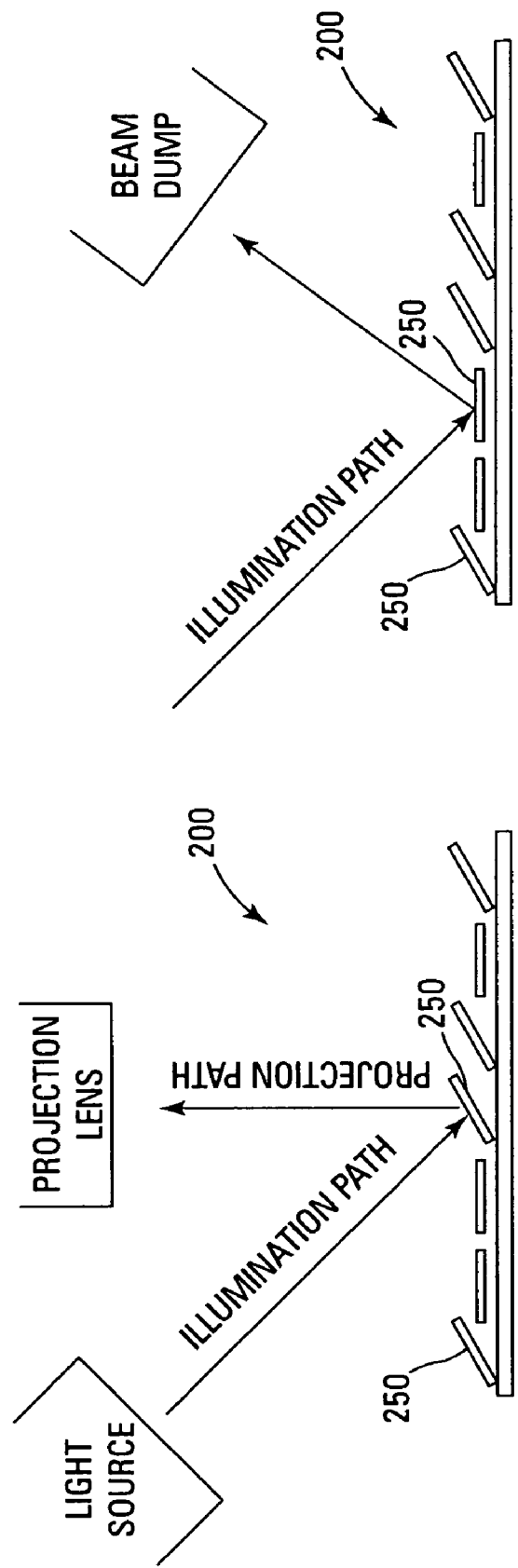

PROJECTOR WITH TOTAL CROSS TOTAL INTERNAL REFLECTION (TIR) PRISMS

BACKGROUND

For some types of digital projectors, the illumination path, projection path, and off-sate light path have an angular separation. For example in DLP™ (digital light processing) digital projectors, an illumination path is off-axis and a projection path is on-axis. This creates a geometrical challenge when combining different-colored light from each of three modulated light pixel arrays (or modulators) and maintaining separation between the illumination path, the projection path, and a beam dump path of the projector.

DESCRIPTION OF THE DRAWINGS

FIGS. 2A and 2B illustrate another exemplary embodiment of a micro-display as a portion of a projector, according to another embodiment of the present disclosure.

DETAILED DESCRIPTION

In the following detailed description of the present embodiments, reference is made to the accompanying drawings that form a part hereof, and in which is shown by way of illustration specific embodiments that may be practiced. These embodiments are described in sufficient detail to enable those skilled in the art to practice disclosed subject matter, and it is to be understood that other embodiments may be utilized and that process, electrical or mechanical changes may be made without departing from the scope of the claimed subject matter. The following detailed description is, therefore, not to be taken in a limiting sense, and the scope of the claimed subject matter is defined only by the appended claims and equivalents thereof.

Figure 1A:
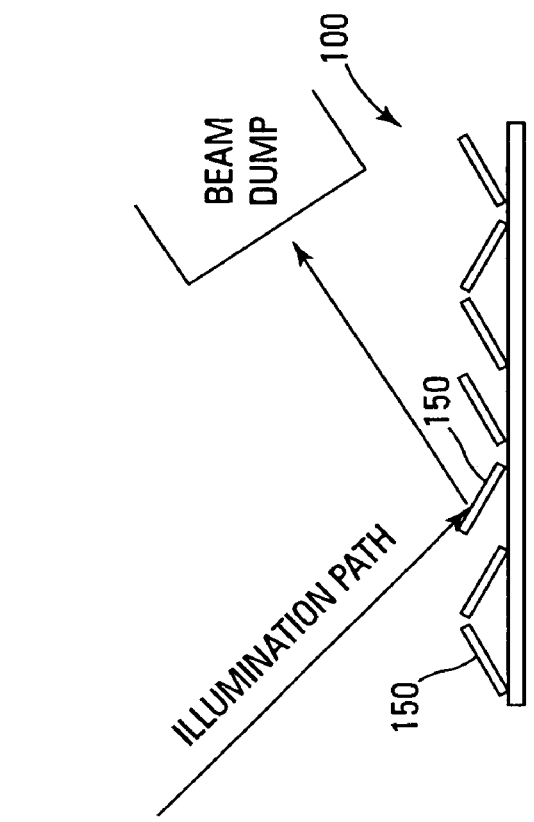
FIGS. 1A and 1B illustrate an exemplary embodiment of a micro-display as a portion of a projector, according to an embodiment of the present disclosure.
Figure 1B:
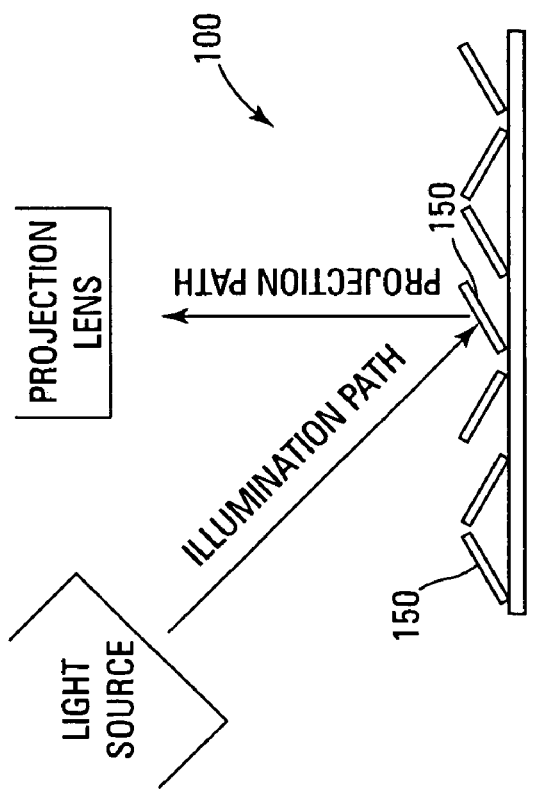

FIGS. 1A and 1B illustrate an exemplary micro-display (or modulator) 100, e.g., a DLP™ (digital light processing) modulator, as a part of a digital projector, according to an embodiment. Each pixel (or modulator) of micro-display 100 corresponds to a tiltable micro-mirror 150. As illustrated in FIG. 1A, when a micro-mirror 150 is tilted into an illumination path, the pixel is ON, and the micro-mirror 150 reflects the light along a projection path to a projection lens. When a micro-mirror 150 is tilted away from the illumination path, as shown in FIG. 1B, the pixel is OFF, and the micro-mirror 150 reflects the light to a beam dump.

FIGS. 2A and 2B illustrate an exemplary micro-display (or modulator) 200 as a part of a digital projector, according to an embodinemt. Each pixel (or modulator) of micro-display 200 corresponds to a tiltable micro-mirror 250. As illustrated in FIG. 2A, when a micro-mirror 250 is tilted into an illumination path, the pixel is ON, and the micro-mirror 250 reflects the light along a projection path to a projection lens. When a micro-mirror 250 is not tilted, as shown in FIG. 2B, the pixel is OFF, and the micro-mirror 250 reflects the light to a beam dump.

Figure 3:
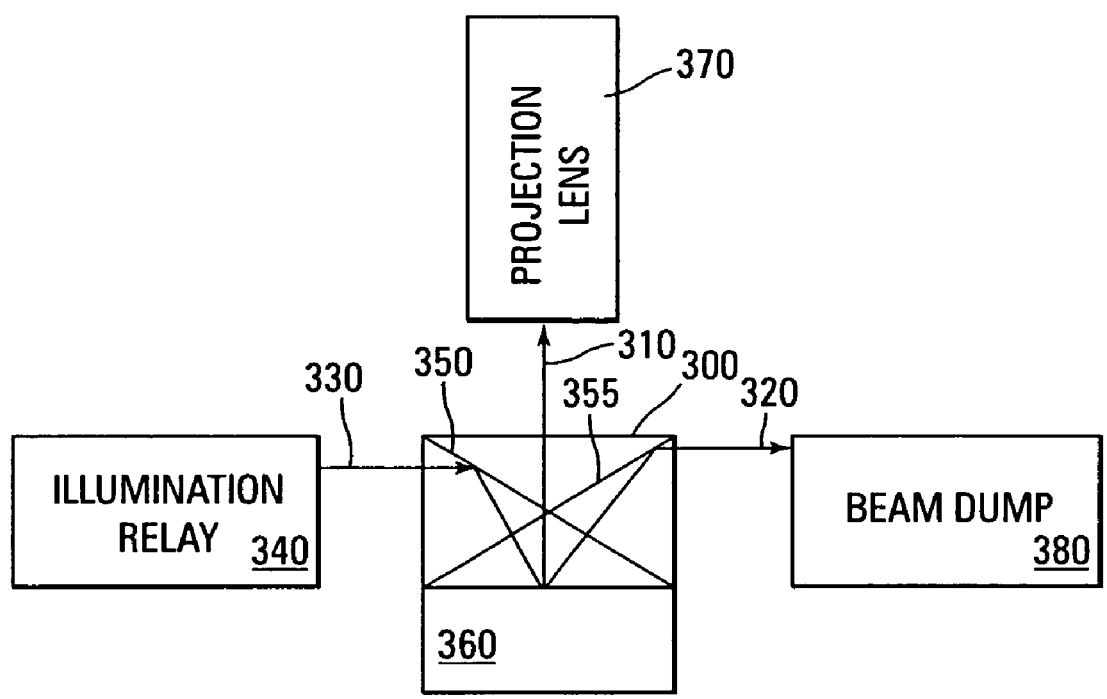
FIG. 3 illustrates an embodiment of a cross TIR (total internal reflection) prism, according to another embodiment of the present disclosure.

FIG. 3 illustrates a cross TIR (total internal reflection) prism 300, according to an embodiment. Cross TIR prism 300 creates a large spatial separation between the projection path 310 and both the beam dump path 320 and illumination path 330. Light from an illumination relay (or light source) 340 enters cross TIR prism 300 and reflects, due to total internal reflection, off TIR interface 350, to a micro-display (or modulator) 360 that may be similar, for one embodiment, to micro-display 100 of FIGS. 1A and 1B or micro-display 200 of FIGS. 2A and 2B. When micro-display 360 is in an ON state, light reflected by micro-display 360 has a small angle of incidence with respect to crossed TIR interfaces 350 and 355 and is transmitted to a projection lens 370. When micro-display 360 is in an OFF state, light reflected by micro-display 360 has a large angle of incidence with respect to TIR interface 355 and is reflected off of TIR interface 355 to a beam dump 380.

Figure 4:
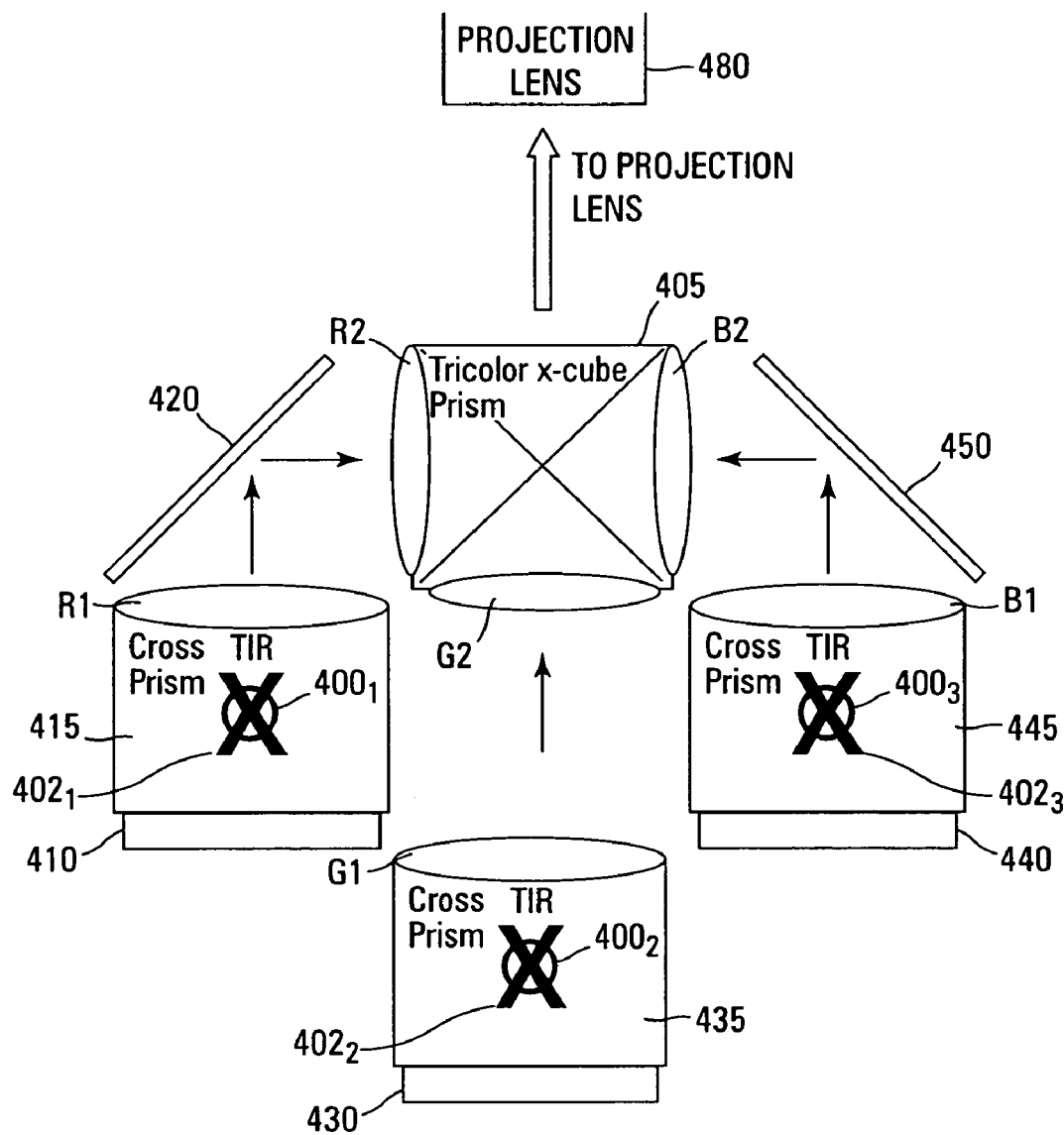
FIG. 4 illustrates an embodiment of a portion of a projector, according to another embodiment of the present disclosure.

The large spatial separation between the projection path 330 and both the beam dump path 320 and illumination path 330 provided by the cross TIR prism enables the architecture of a portion of a projector, as shown in FIG. 4, according to an embodiment. In general, light from an illumination relay or a light source is reflected by a cross TIR prism to a micro-display and then reflected by the micro-display towards a tricolor x-cube prism 405, such as a three-color dichroic x-cube prism Cross TIR prisms 415, 435, and 445 of FIG. 4 are similar to cross TIR prism 300 of FIG. 3 and are rotated 90 degrees from cross TIR prism 300 of FIG. 3. Each of cross TIR prisms 415, 435, and 445 and their respectively corresponding micro-displays 410, 430, and 440 operate similarly to cross TIR prism 300 and micro-display 360 of FIG. 3. Specifically, each of TIR prisms 415, 435, and 445 respectively receives a different colored light, e.g., red, green, and blue, respectively represented by circles $400_1$, $400_2$, and $400_3$ in FIG. 4. A respective light color is reflected by a first one of the crossed TIR interfaces, such as TIR interface 350 in FIG. 3, e.g., in a way similar to that shown in FIG. 3, onto the corresponding micro-display. When the micro-display is ON, the micro-display reflects the light through the crossed TIR interfaces of the corresponding cross TIR prism, e.g., similar to that shown in FIG. 3. When the micro display is OFF, the micro-display reflects the light off a second one of the crossed TIR interfaces of the corresponding cross TIR prism, such as TIR interface 355 in FIG. 3, e.g., in a way similar to that shown in FIG. 3, to a beam dump, such as beam dump 360 of FIG. 3. An "X" represents light reflected to a beam dump, such as Xs $402_1$, $402_2$, and $402_3$ of FIG. 4.

When micro-display 410 is ON, it reflects first colored light through the crossed TIR interfaces of cross TIR prism 415 to a lens R1, optically coupled to cross TIR prism 415. Lens R1 refracts the first colored light to a turning mirror 420, optically coupled to lens R1. Turning mirror 420 turns and reflects the first colored light onto a lens R2, optically coupled between turning mirror 420 and tricolor x-cube prism 405, that refracts the first colored light to tricolor x-cube prism 405.

When micro-display 430 is ON, it reflects second colored light through the crossed TIR interfaces of cross TIR prism 435 to a lens G1, optically coupled to cross TIR prism 435. Lens G1 refracts the second colored light onto a lens G2, optically coupled between lens G1 and tricolor x-cube prism 405, that refracts the second colored light to tricolor x-cube prism 405.

When micro-display 440 is ON, it reflects third colored light through the crossed TIR interfaces of cross TIR prism 445 to a lens B1, optically coupled to cross TIR prism 445.

Lens B1 refracts the third colored light to a turning mirror 450, optically coupled to lens B1. Turning mirror 450 turns and reflects the third colored light onto a lens B2, optically coupled between turning mirror 450 and tricolor x-cube prism 405, that refracts the third colored light to tricolor x-cube prism 405.

Tricolor x-cube prism 405 combines the three light colors. A projection lens 480 optically coupled to tricolor x-cube prism 405 focuses the combined three light colors on a screen (not shown).

CONCLUSION

Although specific embodiments have been illustrated and described herein it is manifestly intended that the scope of the claimed subject matter be limited only by the following claims and equivalents thereof.

What is claimed is:

1. A projector comprising:
   at least first and second micro-displays;
   at least first and second cross total internal reflection (TIR) prisms respectively optically coupled to the at least first and second micro-displays, each of the at least first and second cross total internal reflection prisms having first and second total internal reflection interfaces; and
   a combiner optically coupled to the at least first and second cross total internal reflection prisms;
   wherein each of the at least first and second cross TIR prisms are respectively configured for receiving light at a first direction and configured to reflect the received light from the respective first TIR interface to the respective first and second micro-displays, and
   wherein each of the at least first and second micro-displays and at least first and second cross TIR prisms are configured to direct ON light through the respective first and second TIR interfaces to the combiner, and to direct OFF light from the respective second TIR interfaces at a second direction substantially the same as the first direction to a beam dump.

2. The projector of claim 1, wherein each of the at least first and second micro-displays are respectively configured for receiving different colors of light.

3. The projector of claim 1 further comprises a projection lens optically coupled to the combiner.

4. The projector of claim 1, wherein the combiner is a dichroic x-cube prism.

5. The projector of claim 1, wherein each of the at least first and second micro-displays comprises a plurality of tiltable micro-mirrors.

6. The projector of claim 1 further comprises a turning mirror located between at least one of the at least first and second cross total internal reflection prisms and the combiner.

7. A projector comprising:
   at least first and second micro-displays having at least one mirror configured to have an ON state and an OFF state for reflecting light;
   at least one beam dump;
   at least first and second cross total internal reflection prisms respectively optically coupled to the at least first and second micro-displays and the at least one beam dump, each of the at least first and second cross total internal reflection prisms having first and second total internal reflection interfaces wherein light reflected from the at least first and second micro-displays in the OFF state is directed to the at least one beam dump;
   a combiner optically coupled to the at least first and second cross total internal reflection prisms;
   a turning mirror located between at least one of the at least first and second cross total internal reflection prisms and the combiner; and
   a first lens disposed between the turning mirror and the at least one of the at least first and second cross total internal reflection prisms, and a second lens disposed between the turning mirror and the combiner.

8. A projector comprising:
   at least first and second micro-displays having at least one mirror configured to have an ON state and an OFF state for reflecting light;
   at least one beam dump;
   at least first and second cross total internal reflection prisms respectively optically coupled to the at least first and second micro-displays and the at least one beam dump, each of the at least first and second cross total internal reflection prisms having first and second total internal reflection interfaces; wherein light reflected from the at least first and second micro-displays in the OFF state is directed to the at least one beam dump and
   a combiner optically coupled to the at least first and second cross total internal reflection prisms; and
   one or more lenses disposed between at least one of the at least first and second cross total internal reflection prisms and the combiner.

9. A projector comprising:
   a plurality of micro-displays each configured to receive a different colored light;
   a plurality of cross total internal reflection (TIR) prisms optically coupled one-to-one to the micro-displays, each of the cross total internal reflection prisms having first and second total internal reflection interfaces;
   a tricolor x-cube prism optically coupled to each of the cross total internal reflection prisms; and
   a beam dump;
   wherein each of the plurality of cross TIR prisms are respectively configured for receiving the different colored light at a first direction and configured to reflect the received different colored light from the respective first TIR interface to the respective micro-display, and
   wherein each of the plurality of micro-displays and the plurality of cross TIR prisms are configured to direct ON light through the respective first and second TIR interfaces to the tricolor x-cube prism, and to direct OFF light from the respective second TIR interfaces at a second direction substantially the same as the first direction to the beam dump.

10. The projector of claim 9 further comprises a projection lens optically coupled to the tricolor x-cube prism.

11. The projector of claim 9, wherein each of the micro-displays comprises a plurality of tiltable micro-mirrors.

12. The projector of claim 9 further comprises a turning mirror located between at least one of the cross total internal reflection prisms and the tricolor x-cube prism.

13. A projector comprising:
   a plurality of micro-displays each configured to receive a different colored light and to reflect light in an OFF state and an ON state;
   at least one beam dump;
   a plurality of cross total internal reflection prisms optically coupled one-to-one to the micro-displays and the at least one beam dump, each of the cross total internal reflection prisms having first and second total internal reflection interfaces wherein light reflected from the plurality of micro-displays in the OFF state is directed to the at least one beam dump; and
a tricolor x-cube prism optically coupled to each of the cross total internal reflection prisms;
a turning mirror located between at least one of the cross total internal reflection prisms and the tricolor x-cube prism; and
a first lens disposed between the turning mirror and the at least one of the cross total internal reflection prisms and a second lens disposed between the turning mirror and the tricolor x-cube prism.

14. A projector comprising:
a plurality micro-displays having at least one mirror configured to have an ON state and an OFF state for reflecting light, each micro-display configured to receive a different colored light;
at least one beam dump;
a plurality of cross total internal reflection prisms optically coupled one-to-one to the micro-displays and at least one beam dump, each of the cross total internal reflection prisms having first and second total internal reflection interfaces wherein light reflected from the plurality of micro-displays in the OFF state is directed to the at least one beam dump; and
a tricolor x-cube prism optically coupled to each of the cross total internal reflection prisms; and
one or more lenses disposed between at least one of the cross total internal reflection prisms and the tricolor x-cube prism.

15. A method of operating a projector, comprising:
reflecting light of a first color received from a first direction off a first cross total internal reflection prism and onto a first micro-display;
reflecting light of a second color received from the first direction off a second cross total internal reflection prism and onto a second micro-display;
reflecting a first portion of the light of the first color off the first micro-display to a combiner, and reflecting a second portion of the light of the first color to the first cross total internal reflection prism and off to a second direction substantially the same as the first direction; and
reflecting a first portion of the light of the second color off the second micro-display to the combiner, and reflection a second portion of the light of the second color to the second cross total internal reflection prism and off to the second direction.

16. The method of claim 15 further comprises combining the respective first portions of light of the first color and the light of the second color at the combiner.

17. The method of claim 15, wherein the combiner is a dichroic x-cube prism.

18. The method of claim 15, wherein reflecting the first portion of light of the first color off the first micro-display to the combiner and reflecting the first portion of light of the second color off the second micro-display to the combiner corresponds to an ON state of the first and second micro-displays.

19. The method of claim 15 further comprises:
reflecting light received in the first direction of a third color off a third cross total internal reflection prism and onto a third micro-display; and
reflecting a first portion of the light of the third color off the third micro-display to the combiner; and reflecting a second portion of the light of the third color to the third cross total internal reflection prism and off to the second direction.

20. The method of claim 19 further comprises combining the first portion of light of the first color, the first portion of light of the second color, and the first portion of light of the third color at the combiner.

21. The method of claim 15, wherein reflecting the respective first portions of light of the first and second colors off the first and second micro-displays to the combiner comprises reflecting the respective first portions of light of the first and second colors respectively through the first and second cross total internal reflection prisms and to the combiner.

22. A method of operating a projector, comprising:
reflecting light of a first color off a first cross total internal reflection prism and onto a first micro-display to create an ON state and OFF state;
reflecting light of a second color off a second cross total internal reflection prism and onto a second micro-display to create an ON state and OFF state;
reflecting the light in the ON state of the first color off the first micro-display to a combiner and in the OFF state from the first cross internal reflection prism to a first beam dump;
reflecting the light in the ON state of the second color off the second micro-display to the combiner and in the OFF state from the second cross internal reflection prism to a second beam dump; and
wherein reflecting the light of the first color off the first micro-display to the combiner comprises:
reflecting the light of the first color from the first micro-display to a first lens;
refracting the light of the first color through the first lens;
sending the light of the first color refracted by the first lens to a second lens;
refracting the light of the first color refracted by the first lens through the second lens; and
sending the light of the first color refracted by the first and second lenses to the combiner.

23. The method of claim 22, wherein reflecting the light of the first color off the first micro-display to the combiner further comprises:
sending the light of the first color refracted by the first lens to a mirror before sending it to the second lens; and
reflecting and turning the light of the first color refracted by the first lens to the second lens using the mirror.

24. A method of operating a projector, comprising:
reflecting light of a first color received from a first direction off a first total internal reflection interface of a first cross total internal reflection prism and onto a first micro-display;
reflecting light of a second color received from the first direction off a first total internal reflection interface of a second cross total internal reflection prism and onto a second micro-display;
reflecting the light of the first color off the first micro-display to a combiner when the first micro display is in an ON state;
reflecting the light of the second color off the second micro-display to the combiner when the second micro display is in an ON state;
reflecting the light of the first color off the first micro-display to a second total internal reflection interface of the first cross total internal reflection prism and reflecting the light of the first color off the second total internal reflection interface of the first cross total internal reflection prism in a second direction substantially the same as the first direction to a first beam dump when the first micro display is in an OFF state; and reflecting the light of the second color off the second micro-display to a second total internal reflection interface of the second cross total internal reflection prism and reflecting the light of the second color off the second total internal reflection interface of the second cross total internal reflection prism in the second direction to a second beam dump when the second micro display is in an OFF state.

25. The method of claim 24 further comprises:

reflecting light of a third color received from the first direction off a first total internal reflection interface of a third cross total internal reflection prism and onto a third micro-display;

reflecting the light of the third color off the third micro-display to the combiner when the third micro display is in an ON state; and reflecting the light of the third color off the third micro-display to a second total internal reflection interface of the third cross total internal reflection prism and reflecting the light of the third color off the second total internal reflection interface of the third cross total internal reflection prism in the second direction to a third beam dump when the third micro display is in an OFF state.

26. The method of claim 25 further comprises combining the light of the is first color, the light of the second color, and the light of the third color at the combiner.

27. The method of claim 25, wherein reflecting the light of the first, second, and third colors off the first, second, and third micro-displays to the combiner comprises reflecting the light of the first, second, and third colors respectively through the first second, and third cross total internal reflection prisms and to the combiner.

* * * * *